(12) United States Patent
Tagawa et al.

(10) Patent No.: US 9,535,354 B2
(45) Date of Patent: Jan. 3, 2017

(54) CONDUCTIVE ROLLER AND MANUFACTURING METHOD THEREOF

(75) Inventors: Hirotaka Tagawa, Yokohama (JP); Junichi Takano, Yokohama (JP); Izumi Yoshimura, Yokohama (JP); Daijirou Sirakura, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/516,129

(22) PCT Filed: Dec. 15, 2010

(86) PCT No.: PCT/JP2010/072571
§ 371 (c)(1),
(2), (4) Date: Jul. 16, 2012

(87) PCT Pub. No.: WO2011/074610
PCT Pub. Date: Jun. 23, 2011

(65) Prior Publication Data
US 2012/0316045 A1      Dec. 13, 2012

(30) Foreign Application Priority Data
Dec. 15, 2009    (JP) .................................. 2009-284339

(51) Int. Cl.
*F16C 13/00*    (2006.01)
*G03G 15/02*    (2006.01)
(Continued)

(52) U.S. Cl.
CPC ........... *G03G 15/0233* (2013.01); *F16L 13/00* (2013.01); *G03G 15/0818* (2013.01); *G03G 15/1685* (2013.01); *B29L 2031/326* (2013.01)

(58) Field of Classification Search
CPC ................ F16C 13/00; B29L 2031/326; B29L 2031/324
(Continued)

(56) References Cited

U.S. PATENT DOCUMENTS 5,493,369 A * 2/1996 Sypula et al. ................ 399/240
5,688,886 A * 11/1997 Noguchi ................ C08F 20/12
526/273
(Continued)

FOREIGN PATENT DOCUMENTS

CN         1963685 A       5/2007
EP         2515180 A1 * 10/2012 ............. G03G 15/08
(Continued)

OTHER PUBLICATIONS

English machine translation of JP 10159834.*
(Continued)

*Primary Examiner* — Essama Omgba
(74) *Attorney, Agent, or Firm* — Sughrue Mion, PLLC

(57) ABSTRACT

A conductive roller in which dripping of a water-based coating during the manufacture thereof is restrained, and a manufacturing method thereof. The conductive roller includes a shaft, at least one elastic layer formed on the outer periphery of the shaft and a surface layer formed on the outer peripheral surface of the elastic layer. The elastic layer is formed by using a coating for elastic layers containing a liquid absorbing agent, and the surface layer is formed by using a coating for surface layers. The method comprises forming an elastic layer by applying a coating for elastic layers containing a liquid absorbing agent on the outer periphery of the shaft and drying to form the elastic layer; and forming a surface layer by, after forming the elastic layer, applying a coating for surface layers on the formed elastic layer and drying to form the surface layer.

15 Claims, 1 Drawing Sheet

(51) Int. Cl.
*F16L 13/00* (2006.01)
*G03G 15/08* (2006.01)
*G03G 15/16* (2006.01)
*B29L 31/32* (2006.01)

(58) Field of Classification Search
USPC ... 492/56, 59, 53, 48; 29/895, 895.3, 895.32
See application file for complete search history.

(56) References Cited

U.S. PATENT DOCUMENTS

| | | | | |
|---|---|---|---|---|
| 5,740,008 | A * | 4/1998 | Masuda | G03G 15/0233 |
| | | | | 361/225 |
| 5,753,154 | A * | 5/1998 | Hayashi et al. | 264/45.9 |
| 5,767,188 | A * | 6/1998 | Kamikuri | C08J 7/047 |
| | | | | 427/372.2 |
| 6,699,944 | B1 * | 3/2004 | Fujita | C08F 8/00 |
| | | | | 525/209 |
| 7,237,887 | B2 * | 7/2007 | Ueki et al. | 347/101 |
| 7,497,564 | B2 * | 3/2009 | Yui | 347/101 |
| 7,526,239 | B2 * | 4/2009 | Kawano et al. | 399/286 |
| 7,689,154 | B2 * | 3/2010 | Asakura et al. | 399/340 |
| 8,376,922 | B2 * | 2/2013 | Akama et al. | 492/56 |
| 8,943,692 | B2 * | 2/2015 | Takano et al. | 29/895.32 |
| 2002/0119324 | A1 * | 8/2002 | Harashima et al. | 428/423.3 |
| 2002/0188072 | A1 * | 12/2002 | Kanakura | C08F 299/00 |
| | | | | 525/165 |
| 2005/0212884 | A1 * | 9/2005 | Ueki et al. | 347/105 |
| 2006/0055755 | A1 * | 3/2006 | Yui | 347/101 |
| 2006/0061642 | A1 * | 3/2006 | Ueki | 347/101 |
| 2007/0003331 | A1 * | 1/2007 | Kawano et al. | 399/286 |
| 2007/0098422 | A1 * | 5/2007 | Asakura et al. | 399/44 |
| 2007/0197362 | A1 * | 8/2007 | Sakata et al. | 492/49 |
| 2008/0074462 | A1 * | 3/2008 | Hirakawa | 347/28 |
| 2008/0146427 | A1 * | 6/2008 | Osaku | 492/56 |
| 2008/0212305 | A1 * | 9/2008 | Kawana | C09B 67/0033 |
| | | | | 362/84 |
| 2008/0292366 | A1 * | 11/2008 | Akama et al. | 399/286 |
| 2009/0010690 | A1 * | 1/2009 | Kanesugi et al. | 399/336 |
| 2009/0245892 | A1 * | 10/2009 | Obara | G03G 15/0808 |
| | | | | 399/286 |
| 2010/0261002 | A1 | 10/2010 | Tajima et al. | |
| 2012/0322637 | A1 * | 12/2012 | Takano et al. | 492/56 |
| 2014/0100097 | A1 * | 4/2014 | Takano et al. | 492/56 |

FOREIGN PATENT DOCUMENTS

| | | | | |
|---|---|---|---|---|
| JP | 07072710 A | * | 3/1995 | G03G 15/02 |
| JP | 07-199645 A | | 8/1995 | |
| JP | 09-297454 A | | 11/1997 | |
| JP | 10-159834 A | | 6/1998 | |
| JP | 11-316487 A | | 11/1999 | |
| JP | 2000-213529 A | | 8/2000 | |
| JP | 2003-098818 A | | 4/2003 | |
| JP | 2004-335316 A | | 11/2004 | |
| JP | 2004309856 A | * | 11/2004 | |
| JP | 2005-257921 A | | 9/2005 | |
| JP | 2006-176550 A | | 7/2006 | |
| JP | 2009109910 A | | 5/2009 | |

OTHER PUBLICATIONS

Machine English translation of JP 2003098818, published Apr. 4, 2003.*
English machine translation of JP 2003-098818, published Apr. 4, 2003.*
International Search Report for PCT/JP2010/072571, dated Jan. 18, 2011.
Chinese Office Action and Search Report, dated Nov. 29, 2013, issued in corresponding Chinese Patent Application No. 201080057160.X.
Extended European search report dated Sep. 14, 2015, issued by the European Patent Office in corresponding European Application No. 10837636.9.

* cited by examiner

CONDUCTIVE ROLLER AND MANUFACTURING METHOD THEREOF

CROSS REFERENCE TO RELATED APPLICATIONS

This application is a National Stage of International Application No. PCT/JP2010/072571 filed Dec. 15, 2010, claiming priority based on Japanese Patent Application No. 2009-284339 filed Dec. 15, 2009, the contents of all of which are incorporated herein by reference in their entirety.

TECHNICAL FIELD

The present invention relates to a conductive roller (hereinafter, also simply referred to as "roller") and a manufacturing method thereof, and more particularly, to a conductive roller suitable for a roller member, in particular, a developing roller or a charging roller used for various applications such as development, charging, transfer (toner supply, cleaning) and the like, in an image forming apparatus using a xerography, and a manufacturing method thereof.

BACKGROUND OF THE INVENTION

Generally, in an image forming apparatus using a xerography such as a copier, a printer or a facsimile, in the image forming steps, a roller to which a conductivity is imparted such as a transfer roller, a developing roller, a toner supply roller, a charging roller, a cleaning roller, an intermediate transfer roller or a belt driving roller is used.

As the roller members used as developing rollers, charging rollers and transfer rollers (toner supply and cleaning) or the like, ones provided with a basic structure having an elastic layer comprising a conductive rubber, polymeric elastomer, polymeric foam or the like given electric conductivity by blending a conductive agent therein, which elastic layer is formed on the outer periphery of the shaft; and further with a single or multiple water-based coating layers on the outer periphery of the layer to attain a desired surface roughness, conductivity, hardness and the like; have been conventionally used.

However, there is a problem in that a surface layer using a water-based coating sticks to an image carrier due to having an excess amount of water when left under high temperature and high humidity, and thereafter, the layer is peeled off. For this reason, Patent Document 1 proposes a charging member in which the mass change of the material which forms the surface layer thereof due to water absorption accompanied by the environmental change from a temperature of 23° C. and a relative humidity of 50% to a temperature of 40° C. and a relative humidity of 95% is set to be 3.0% or less. Further, Patent Document 2 discloses a conductive member in which, for the purpose of obtaining a stable conductivity without being affected by the temperature or the humidity, a conductive fiber is planted on a substrate via an adhesion layer, and the conductive fiber has a structure in which a conductive polymer layer and a water-retaining layer are laminated.

RELATED ART DOCUMENTS

Patent Documents

Patent Document 1: Japanese Unexamined Patent Application Publication No. 11-316487 (Claims and the like)

Patent Document 2: Japanese Unexamined Patent Application Publication No. 2004-335316 (Claims and the like)

SUMMARY OF THE INVENTION

Problems to be Solved by the Invention

In cases where a conductive roller is manufactured using a water-based coating, when the film thickness is small, a discharge between the shaft and the photoreceptor drum may occur, which may break the photoreceptor drum or cause a poor charge. For this reason, in order to secure the film thickness of the layers, plural repetitive applications of a water-based coating are necessary. However, when a water-based coating is applied, dripping by the application thereof may occur before the coating is dried. When such dripping occurs, there is a problem in that the resistivity varies due to uneven film thickness, thereby generating image unevenness. For this reason, it is desired that dripping during manufacturing a conductive roller be restrained.

In the technique described in Patent Document 1, since only the water absorption of a surface layer is defined, when a water-based coating is applied, dripping by the application thereof cannot be sufficiently restrained before the coating is dried even though the high temperature and high humidity environment is considered. Further, since the technique described in Patent Document 2 is a technique in which a conductive fiber is provided on the surface layer of the conductive member, when a water-based coating is applied, dripping by the application thereof also cannot be sufficiently restrained before the coating is dried even though the temperature and the humidity of the outside air are considered.

Still further, in order to prevent dripping by application, for solvent coating, a method in which synthesized fine silica, organic bentonite, metal soap, white carbon, fatty amide or the like is used, and for water-based coating, a method in which bentonite, methylcellulose, polyvinyl alcohol or the like is used are proposed respectively. In both methods, dripping is prevented by making the viscosity thixotropic. Even in cases where these methods are used, when applications of a water-based coating are repeated for plural times, a sufficient effect of preventing dripping cannot be obtained.

An object of the present invention is to provide a conductive roller in which dripping of a coating, in particular, a water-based coating during the manufacture thereof is restrained, and a manufacturing method thereof.

Means for Solving the Problems

In order to solve the above-mentioned problems, the present inventors intensively studied to discover that, by employing a coating containing a liquid absorbing agent, generation of dripping during application on the surface layer can be restrained, to thereby completing the present invention.

That is, the conductive roller of the present invention is a conductive roller comprising a shaft, at least one elastic layer formed on the outer periphery of the shaft and a surface layer formed on the outer peripheral surface of the elastic layer, wherein the elastic layer is formed by using a coating for elastic layers containing a liquid absorbing agent, and the surface layer is formed by using a coating for surface layers.

The conductive roller of the present invention has two or more layers of the elastic layers, each of the elastic layers} being formed by using a coating for elastic layers containing a liquid absorbing agent. Further, in the present invention, it is preferred that both of the coating for elastic layers and the coating for surface layers contain a water-based coating. Still further, it is preferred that the liquid absorbing agent be hydrophilic silica or water absorbing polymer and the coating for surface layers contain a waterproofing agent.

The manufacturing method of a conductive roller comprises:

an elastic layer formation step (A) in which a coating for elastic layers containing a liquid absorbing agent is applied on the outer periphery of a shaft and dried to form an elastic layer; and a surface layer formation step (B) in which, after the elastic layer formation step (A), a coating for surface layers is applied on the formed elastic layer and dried to form a surface layer.

In the manufacturing method of a conductive roller of the present invention, it is preferred that the elastic layer formation step (A) be repeated. Further, it is preferred that, as the coating for elastic layers and the coating for surface layers, ones containing a water-based coating be used. Still further, it is preferred that, as the liquid absorbing agent, hydrophilic silica or water absorbing polymer be used, and that a waterproofing agent be contained in the coating for surface layers.

Effect of the Invention

By the present invention, a conductive roller in which dripping of a coating, in particular, a water-based coating during the manufacture thereof is restrained, and a manufacturing method thereof can be attained.

MODES FOR CARRYING OUT THE INVENTION

A preferred embodiment of the present invention will be described in detail with reference to the drawings.

Figure 1:
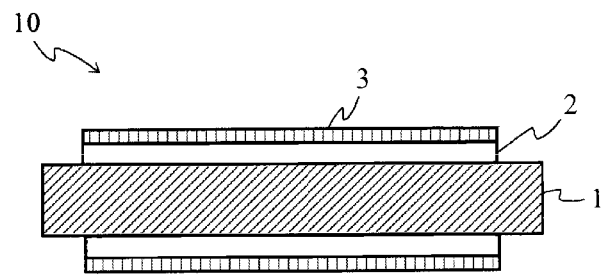
FIG. 1 is a cross-sectional view illustrating one example of a conductive roller according to a preferred embodiment of the present invention.

FIG. 1 is a cross-sectional view illustrating one example of a conductive roller according to a preferred embodiment of the present invention. A conductive roller 10 of the present invention comprises a shaft 1, at least one elastic layer 2 formed on the outer periphery of the shaft 1 and a surface layer 3 formed on the outer peripheral surface of the elastic layer. In the present invention, the elastic layer 2 means a layer between the surface layer 3 and the shaft 1 and also includes a layer such as a resistivity adjusting layer containing a conductive agent or an adhesion layer for adhesion. In the following embodiment, a roller will be explained by way of example in the case where a water-based coating composition containing a water-based coating is used as a coating.

In the present embodiment, it is important that the elastic layer 2 be formed by employing a water-based coating composition for elastic layers containing a water absorbing agent and that the surface layer 3 be formed by employing a water-based coating composition for surface layers. In this case, each of the elastic layer 2 and the surface layer 3 is formed by applying a water-based coating composition, and then by drying. In the present invention, when a water-based coating composition is applied plural times, by adding a water absorbing agent which absorbs water to the elastic layer 2 which is an underlayer of the surface layer 3, the water absorbing agent in the elastic layer 2 can absorb water in the surface layer 3. By this, the apparent drying rate of the surface layer 3 increases, thereby preventing dripping of the coating during the formation of the surface layer 3. Further, because water does not come out from the surface of the surface layer 3 since a water absorbing agent is added to the elastic layer 2 which is directly in contact with the surface layer 3, a conductive roller does not stick to a photoconductor or the like even under high temperature and high humidity. As a result, surface layer 3 is not peeled off and a favorable image without unevenness can be obtained.

Figure 2:
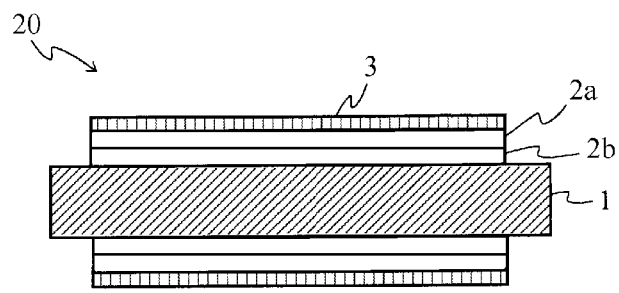
FIG. 2 is a cross-sectional view illustrating another example of a conductive roller according to a preferred embodiment of the present invention.

Still further, in the present embodiment, the roller only needs to have at least one layer as the elastic layer 2, and may have two or more elastic layers. In this case, it is necessary at least to use a water-based coating composition containing a water absorbing agent for the elastic layer 2 which is directly in contact with the surface layer 3, and it is preferred that each elastic layer be formed by using a water-based coating composition containing a water absorbing agent. FIG. 2 is a cross-sectional view illustrating another example of a conductive roller according to the preferred embodiment of the present invention. In FIG. 2, a conductive roller 20 has two elastic layers 2a, 2b. In this case, it is necessary that a water absorbing agent which absorbs water be added to the elastic layer 2a which is an underlayer of the surface layer 3 in order to increase the drying rate by absorbing water in the surface layer 3. In addition, a water absorbing agent is also added to the elastic layer 2b in order to increase the drying rate by absorbing water in the elastic layer 2a. In the same manner as in FIG. 2 where the case of two elastic layers is illustrated, in cases where three or more layers are used as the elastic layers, it is necessary that a water absorbing agent be added to an elastic layer just under the surface layer. It is preferred that a water absorbing agent be added to other lower elastic layers. In the present embodiment, for one elastic layer, a layer formed by continuously repeatedly applying a water-based coating composition for elastic layers having completely the same ingredients and then drying is employed; and for the other elastic layer, a layer formed by applying a water-based coating composition for elastic layers having different ingredients and then drying is employed.

The manufacturing method of a conductive roller of the present embodiment comprises: an elastic layer formation step (A) in which a water-based coating composition for elastic layers containing a water absorbing agent is applied on the outer periphery of a shaft and dried to form an elastic layer; and a surface layer formation step (B) in which, after the elastic layer formation step (A), a water-based coating composition for surface layers on the formed elastic layer and dried to form a surface layer. By using a water-based coating composition, a coating can be applied on the shaft 1 in a thin layer and it is easy to handle a solvent. By forming the elastic layer 2 which is an underlayer by applying a water-based coating composition for elastic layers containing a water absorbing agent and drying, the apparent drying rate of the surface layer 3 which is the upper layer increases, thereby preventing dripping of the coating during the formation of the surface layer 3. Further, because water does not come out from the surface of the surface layer 3 since a water absorbing agent is added to the elastic layer 2 which is directly in contact with the surface layer 3, the conductive roller does not stick to a photoconductor or the like even under high temperature and high humidity. As a result, the surface layer 3 is not peeled and a favorable image without unevenness can be obtained.

In the manufacturing method of a conductive roller of the present embodiment, it is preferred to repeat the elastic layer formation step (A). A water-based coating composition for elastic layers having completely the same ingredients is employed and continuously repeatedly applied and dried to form a layer, thereby obtaining an elastic layer having a sufficient layer thickness. A water-based coating composition for elastic layers having different ingredients are serially employed, and dried after application thereof to form a layer, thereby obtaining a conductive roller having two or more elastic layers.

In the present embodiment, the repeat count of the elastic layer formation step (A) is not particularly limited, and preferably 2 to 9 times, more preferably 3 to 8 times and still more preferably 4 to 7 times. By employing the repeat count in such ranges, an elastic layer having a favorable film thickness can be formed.

In the present embodiment, the water absorbing agent is not particularly limited as long as water in the surface layer 3 which is an upper layer can be absorbed and the apparent drying rate of the surface layer 3 can be increased by adding the agent to the elastic layer 2 which is an underlayer, and preferably is silica or a water absorbing polymer.

As silica, hydrophobic silica such as silica silylate (manufactured by Nippon Aerosil Co., Ltd.) may be used, and preferably, hydrophilic silica is used. Examples of such hydrophilic silica include Fine Seal X-12 (manufactured by Tokuyama Corporation). In cases where dripping is prevented by adding thereto a thickener or a dripping preventing agent, although the limit of film thickness has been from 70 to 100 μm per one dipping coating process, by applying a water-based coating composition for elastic layers to which hydrophilic silica is added to an elastic layer and applying a water-based coating composition for surface layers to a surface layer, the surface layer can have a film thickness of 100 to 200 μm.

The amount of the above-mentioned hydrophilic silica is preferably 1 to 50 parts by mass with respect to 100 parts by mass of the water-based coating contained in the coating of the elastic layer 2. When the amount of hydrophilic silica added is too small, a sufficient water-absorbing effect cannot be obtained. On the other hand, when the amount of hydrophilic silica added is larger than 50 parts by mass, a favorable film may not be formed.

The above-mentioned water absorbing polymer is not particularly limited as long as the polymer has an excellent water-absorbing quality. Examples thereof include those obtained by slightly crosslinking an electrolyte polymer having an ionizable group or a hydrophilic polymer having a hydroxyl group, and having a capability of absorbing water having a weight 50 to 1000 times its own weight and retaining the water.

Examples of water absorbing polymers used in the present embodiment include those obtained by polymerizing a hydrophilic polymer such as 2-hydroxyethyl(meth)acrylate, 2-hydroxypropyl(meth)acrylate, glycerol(meth)acrylate, 2-acrylamide-2-methylpropanesulfonic acid, sodium sulfonate ethyl(meth)acrylate, (meth)acrylamide, N,N-dimethylaminoethyl (meth)acrylate, N,N-diethylaminoethyl (meth) acrylate, N-isopropylacrylamide, N,N-dimethyl aminopropyl acrylamide, 2-methacryloxyethyl trimethyl ammonium chloride, (meth)acrylic acid, sodium (meth) acrylate, 2-(meth)acryloyloxyethyl succinate, 2-(meth)acryloyloxyethyl phthalic acid, 2-(meth)acryloyloxyethyl hexahydrophthalate, ω-carboxy-polycaprolactone monoacrylate, EO denatured phosphoric acid (meth)acrylate, polyethylene glycol (meth)acrylate, acryloylmorpholine, p-styrenesulfonic acid, vinyl sulfonic acid, allylsulfonic acid, (meth) acrylate ethyl sulfonic acid or water-soluble urethane modified acrylate.

In the present embodiment, the water absorbing polymer may be a homopolymer of one type of the above-mentioned hydrophilic polymer, may be a copolymer of two or more types of the above-mentioned hydrophilic polymers, and may be a copolymer of one or two types of the above-mentioned hydrophilic polymers and one or two types of other monomers. It noted that, when the other monomers are hydrophobic monomers such as styrene or (meth)acrylic acid ester, the copolymerization ratio is required to be in a range in which the hydrophilicity or the water-absorbing quality is not compromised. The water absorbing polymer may be denatured in a range in which the effect of the present invention is not compromised, and may be cross-linked by monomer or oligomer having two or more reactive functional groups to the extent that the hydrophilicity or the water-absorbing quality is not compromised. Further, in the present embodiment, for the elastic layer 2, only one type of water absorbing polymer may be used and two or more types of water absorbing polymers may be used.

In general, since such water absorbing polymers are manufactured as particles having a particle size of about 10 to 1000 μm, in the present invention, such particulate water absorbing polymers can be employed as it is.

Specific examples of the above-mentioned water absorbing polymers include 10SH—NF (sodium salt cross-linkage in the acrylic acid polymer, manufactured by Sumitomo Seika Chemicals Company Limited).

The amount of the above-mentioned water absorbing polymer is preferably 0.1 to 3.0 parts by mass with respect to 100 parts by mass of the water-based coating contained in the coating of the elastic layer 2. When the amount of the water absorbing polymer added is smaller than 0.1 parts by mass, a sufficient water-absorbing effect may not be obtained. On the other hand, the amount of the water absorbing polymer added is larger than 3.0 parts by mass, a favorable film may not be formed.

In the present invention, a water-based coating composition for surface layers preferably contains a waterproofing agent. Since this can prevent the absorption of water in the surface layer 3, the effect of humidity or the like in the atmosphere can be prevented, thereby preventing expansion due to water of the elastic layer.

The above-mentioned waterproofing agent is not particularly limited as long as the agent can be added to the coating, and further, as long as the agent can prevent the absorption of water in the surface layer 3, and examples thereof include ammonium zirconium carbonate.

The amount of the above-mentioned waterproofing agent is preferably 0.1 to 10 parts by mass with respect to 100 parts by mass of the water-based coating contained in the coating of the surface layer 3. When the amount of the waterproofing agent added is smaller than 0.1 parts by mass, a sufficient waterproofing effect may not be obtained. On the other hand, the amount of the waterproofing agent added is larger than 10 parts by mass, a favorable film may not be formed.

In the present invention, the only difference between the coating which can be used in the elastic layer 2 and the coating which can be used in the elastic layer 3 is that it is necessary that the coating which can be used in the elastic layer 2 contain a liquid absorbing agent. Each of the following water-based coating compositions can be used, and the coating which can be used in the elastic layer 2 and the coating which can be used in the elastic layer 3 have completely the same composition or different compositions. In the present embodiment, since a coating contained in the water-based coating is used, the roller of the present embodiment has an extremely small effect on the environment as compared to those which use solvent.

As the water-based coating which can be used in the present embodiment, one or more types selected from the group consisting of rubbers, urethanes and acryls can be suitably used. As the rubbers, latex such as natural rubber (NR), chloroprene rubber (CR), nitrile rubber (NBR) or styrene butadiene rubber (SBR); as the urethane, emulsion or dispersion such as ethers or esters; and as the acryls, emulsions such as acryl, acryl styrene can be suitably used.

As the water-based coating which can be used in the present embodiment is preferably a water-based acrylic resin. Examples of such a water-based acrylic resin preferably include those having acrylonitrile and n-butyl acrylate as essential components and optionally having other monomers. Examples of the other monomers include ethyl acrylate, acrylic acid 2-ethylhexyl, acrylic acid, methacrylic acid. The resin has acrylonitrile and n-butyl acrylate as essential components because these contribute to the improvement of the elasticity (setting properties). From this point of view, it is preferred that the amount of n-butyl acrylate be increased as much as possible; the amount of other components be decreased as much as possible; and the monomer ratio of the other monomer components than the essential components be decreased. On the other hand, when the ratio of the acrylonitrile is increased too much, the elastic layer or the like becomes hard, which is not desirable. The monomer ratio of n-butyl acrylate and acrylonitrile which are necessary components are, therefore, preferably in a range of 1 to 25:99 to 75, in particular 5 to 20:95 to 80 based on molar ratio.

The above-mentioned water-based acrylic resin preferably contains a group having an active hydrogen. Examples of the groups having an active hydrogen include a carboxyl group, a hydroxyl group and an amino group, and preferably a carboxyl group. In the present invention, the ratio of the monomer containing such an active hydrogen is preferably in a range of 3 to 6% of the total amount of the monomers. In the present invention, by setting the ratio of monomers containing groups having an active hydrogen in this range, a water-based acrylic resin whose surface acid value is adjusted to not smaller than 10 mg/g, for example, 10 to 20 mg/g can be suitably used.

Examples of the water-based coating which can be used in the present embodiment include a water-based emulsion of acrylonitrile-acrylic acid alkyl ester-methacrylic acid-methacrylic acid glycidyl copolymer (manufactured by KOATSU GAS KOGYO CO., LTD., crosslinking temperature 130° C.), EAU363B (acryl urethane resins, manufactured by Asia Industry Co., Ltd.), urethane emulsion (manufactured by DAI-ICHI KOGYO SEIYAKU CO., LTD.), L2001 (SB latex, manufactured by Asahi Kasei Chemicals Corp.), Mowinyl 801 (vinyl acetate emulsion, manufactured by The Nippon Synthetic Chemical Industry Co., Ltd.), Mowinyl 186E (ethylene-vinyl acetate emulsion, manufactured by The Nippon Synthetic Chemical Industry Co., Ltd.) and Mowinyl 937F (acrylic acid-styrene emulsion, manufactured by The Nippon Synthetic Chemical Industry Co., Ltd.).

Conductivity can be imparted to the above-mentioned coating by appropriately adding a conductive agent. Examples of such a conductive agent include ion conductive agents and electron conductive agents. Examples of the ion conductive agents include ammonium salts such as a perchloric acid salt, chlorate, hydrochloride, bromate, iodate, hydrofluoroborate, sulphate, ethyl sulfate, carboxylate or sulfonate of tetraethylammonium, tetrabutylammonium, dodecyltrimethylammonium (for example, lauryltrimethylammonium), hexadecyltrimethylammonium, octadecyltrimethylammonium (for example, stearyltrimethylammonium), benzyltrimethylammonium or modified fatty acid dimethylethylammonium; and perchloric acid salt, chlorate, hydrochloride, bromate, iodate, hydrofluoroborate, trifluoromethyl sulfate or sulfonate of alkali metals or alkaline earth metals such as lithium, sodium, potassium, calcium or magnesium. Examples of the electron conductive agents include conductive carbons such as Ketjen Black or acetylene black; carbon for rubber such as SAF, ISAF, HAF, FEF, GPF, SRF, FT or MT; oxidized carbon for ink, pyrolyzed carbon, natural graphite, artificial graphite; conductive metallic oxides such as tin oxide, titanium oxide or zinc oxide; metals such as nickel, copper, silver and germanium. These conductive agents can be used alone or two or more thereof can be mixed and used. The amount thereof added is not limited and appropriately selected as desired, and may be, for example, 1 to 20 parts by mass with respect to 100 parts by mass of resin components which constitute the elastic layer 2 and the surface layer 3.

Further, to the coatings of the elastic layer 2 and the surface layer 3, other agents such as Microbaloon made of resin, a crosslinking agent, a vulcanizing agent, a vulcanizing accelerator or an age resistor can be appropriately added as needed.

In the present invention, the application method of a coating when forming the elastic layer 2 and the surface layer 3 is not particularly restricted, and usually a method is employed in which the above-mentioned coating is prepared and this coating is applied to the above-mentioned shaft 1 by a dipping method, a spray method, a roll coater method, a die coating method or the like to be solidified by drying. A dipping method is particularly preferably used. Simplification of manufacturing process is possible by directly applying a coating on the shaft 1.

In the conductive roller 10 of the present invention, by repeating an elastic layer formation step once or twice, the thickness of the elastic layer 2 can be 0.05 to 0.1 mm, in particular, 0.06 to 0.09 mm. By repeating the elastic layer formation step for 7 times or 8 times, the thickness of the elastic layer 2 can be 0.5 to 0.7 mm.

In the present invention, as the shaft 1, a hollow cylinder or solid cylinder made of metal or plastics can be used, and preferably a hollow cylinder or solid cylinder made of metal, and more preferably a hollow cylinder made of metal can be used. By using this, the cost can be reduced.

The thickness of the surface layer 3 is set according to the shape or the like of the conductive roller 10, and not particularly restricted, and can be usually 100 to 200 μm, in particular, 120 to 150 μm.

Figure 3:
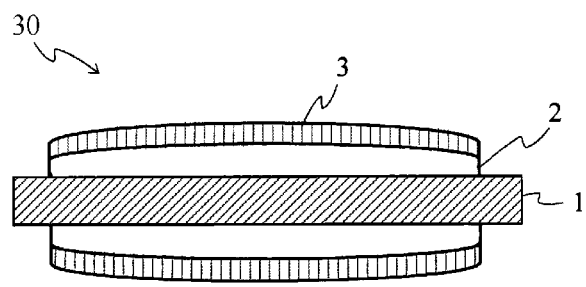
FIG. 3 is a cross-sectional view illustrating still another example of a conductive roller according to a preferred embodiment of the present invention.

FIG. 3 is a cross-sectional view illustrating still another example of preferred embodiments of a conductive roller of the present invention. Since it is important that a uniform working face be formed in the longitudinal direction when the conductive roller is pressed on the photoconductor drum, the illustrated conductive roller 30 has a crown shape whose diameter at the center portion is larger than those at the end portions.

As a crown amount which represents the degree of the protrusion when the portion at the center is more protruded than the portions at the ends in the roller length direction in the cross section of the roller length direction, 50 to 100 μm is preferably employed. By employing this amount, normal images may be made more preferable. If the crown amount is smaller than 50 μm, the contact pressure at the center of the roller in the roller length direction becomes low, while if the crown amount is larger than 100 μm, the portion at the center of the roller in the roller length direction makes too strong contact. Both cases possibly cause ununiformity of the charge amount. The measurement of the crown amount of the conductive roller of the present invention was performed by using High Precision Laser Measuring Machine LSM-430v manufactured by Mitutoyo Corporation, Ltd. External diameters at the center portion and at 90 mm from the center portion in the direction from the center portion to the end portion were measured by this measuring machine, and a roller crown amount is defined as the difference between the external diameter at the center portion and the average of the external diameters at 90 mm from the center portion in the directions from the center portion to the end portions. For example, for an conductive roller having a roller length of 250 mm, external diameters are measured at three point, at 35 mm, 125 mm and 215 mm from one end of the roller. In this case, the crown amount (μm) is calculated by the following formula (1):

$$\text{Crown amount (μm)} = \{B - (A+C)/2\} \times 1000 \quad (1),$$

where the external diameter at 35 mm from one end of the roller is A (mm), the external diameter at 125 mm from one end of the roller is B (mm) and the external diameter at 215 mm from one end of the roller is C (mm).

In the present invention, the conductive rollers 10, 20 and 30 preferably have a deviation (precision of film thickness) of not larger than 70 μm in the whole range in the roller length direction. In cases where the conductive rollers 10, 20 and 30 are used as an electrifying roller to be revolved which being in contact with the photoreceptor, and the photoreceptor are revolving, and when the deviation of the conductive rollers 10, 20 and 30 is large, a gap between the conductive rollers 10, 20 and 30, and the photoreceptor is generated. Further, the gap distance varies. In this case, toner particle and external additives which remain on the photoreceptor are likely to intrude into the gap and then attached irregularly on the conductive rollers 10, 20 and 30. As a result, the surface of the roller becomes mottled with the remain, which produces an image with a low quality. It is noted that the measurement of the deviation of the conductive rollers 10, 20 and 30 of the present invention was performed by using High Precision Laser Measuring Machine LSM-430v manufactured by Mitutoyo Corporation, Ltd. The external diameters for five points in the roller length direction were measured by this measuring machine, and a deviation was defined as the average of the difference between the maximum value and the minimum value of the measured external diameter for each point.

Although, in the above-mentioned embodiment, cases where those containing as a coating a water-based coating are used are explained, in the present invention, also in cases where a hydrophobic solvent is used as a coating, the same effect can be obtained. That is, in these cases, the elastic layer 2 is formed by using a solvent coating composition for elastic layers containing a liquid absorbing agent, as well as the surface layer 3 is formed by using a solvent coating composition for surface layers. Also in this case, by adding a liquid absorbing agent which absorbs a solvent to the elastic layer 2 which is an underlayer of the surface layer 3, the liquid absorbing agent in the elastic layer 2 can absorb water in the surface layer 3. By this, the apparent drying rate of the surface layer 3 increases, thereby preventing dripping of the coating during the formation of the surface layer 3. Examples of the solvent coating in the present invention include those in which urethane resins are dissolved in a solvent such as methyl ethyl ketone (MEK), methyl isobutyl ketone (MIBK) or toluene, and an isocyanate curing agent is added thereto.

EXAMPLES

The present invention will now be described in detail by way of Examples.

Example 1

According to the formulation described in the Table 1 below, EPOCROS (emulsion of oxazoline group containing styrene-acrylic copolymer), water dispersion carbon, Fineseal X-12 (hydrophilic silica), SN Defoamer 777 (defoamer), SN Wet 970 (wetting agent) and UH420 (thickener) were added to a water-based coating (a water emulsion of acrylonitrile-acrylic acid alkyl ester-methacrylic acid-methacrylic acid glycidyl copolymer), and stirred by a stirrer. Each water-based coating to which the ingredients were added was filtered by a mesh to remove aggregates. The obtained water-based coating was coated on a shaft made of metal by dipping and dried for 30 minutes at room temperature and for 20 minutes at 110° C. to form an elastic layer. The coating and drying process of the elastic layer was performed once.

According to the formulation described in the Table 1 below, EPOCROS (emulsion of oxazoline group containing styrene-acrylic copolymer), water dispersion carbon, AZ Coat 5800MT (ammonium zirconium carbonate), SN Defoamer 777 (defoamer), SN Wet 970 (wetting agent) and UH420 (thickener) were added to a water-based coating (a water emulsion of acrylonitrile-acrylic acid alkyl ester-methacrylic acid-methacrylic acid glycidyl copolymer), and stirred by a stirrer. Each water-based coating to which the ingredients were added was filtered by a mesh to remove aggregates. The obtained water-based coating was coated on an elastic layer by dipping and dried for 30 minutes at room temperature and for 20 minutes at 110° C. to form a surface layer, thereby obtaining a conductive roller of FIG. 1.

Examples 2, 3 and Comparative Examples 1, 2

A conductive roller was obtained in the same manner as in Example 1, except that the formulation in the Table 1 below. In Example 3, both the elastic layer and the surface layer have the formulation of a hydrophobic solvent coating, and the silica silylate functions as a liquid absorbing agent which absorbs a hydrophobic solvent.

(Measurement of Film Thickness and Existence of Dripping)

The existences of film thickness and dripping of the elastic layer and the surface layer were measured by using a high precision laser measuring apparatus LSM-430v manufactured by Mitutoyo Corporation. The existence of dripping was determined by the measured shape. The results of the film thicknesses of the elastic layer and the surface layer, the total film thickness of these and the existence of dripping thereof were described in the Table 1 below. The total film thickness of the layers left to stand under high temperature and high humidity at 40° C. at 95 RH % (high temperature and high humidity film thickness) was measured by using a high precision laser measuring apparatus LSM-430v manufactured by Mitutoyo Corporation. The ratios of the initial total film thickness to the high temperature and high humidity film thickness (film thickness ratio) were calculated and the results thereof were individually listed on Table 1. When the film thickness ratio is not larger than 1.05, a conductive roller does not stick to a photoconductor or the like even under high temperature and high humidity, and the result is considered to be good.

swelled under high temperature and high humidity, and a favorable conductive roller cannot be obtained.

DESCRIPTION OF SYMBOLS

1 shaft
2 elastic layer
3 surface layer
10, 20, 30 conductive roller

The invention claimed is:

1. A conductive roller comprising a shaft, at least one elastic layer formed on the outer periphery of the shaft and a surface layer formed on the outer peripheral surface of the elastic layer, wherein

TABLE 1

| | | Brand Name | Example 1 | Example 2 | Example 3 | Comparative Example 1 | Comparative Example 2 |
|---|---|---|---|---|---|---|---|
| Elastic Layer | Formulation (Parts by Mass) | Water-based coating *1 | 100 | 100 | — | 100 | 100 |
| | | EPOCROS *2 | 5 | 5 | — | 12 | 12 |
| | | Water dispersion carbon *3 | 10 | 10 | — | 10 | 10 |
| | | Fineseal X-12 *4 | 7.5 | — | — | — | — |
| | | 10SH-NF *5 | — | 1 | — | — | — |
| | | SN Defoamer 777 *6 | 1 | 1 | — | 1 | 1 |
| | | SN Wet 970 *7 | 1 | 1 | — | 1 | 1 |
| | | UH420 *8 | 1.6% | 1.6% | — | 1.6% | 1.6% |
| | | Resin component *9 | — | — | 100 | — | — |
| | | Excel Hardener HX *10 | — | — | 12 | — | — |
| | | AEROSIL R812S *11 | — | — | 2 | — | — |
| | | Methylcyclohexane *12 | — | — | 100 | — | — |
| Surface layer | Formulation (Parts by Mass) | Water-based coating *1 | 100 | 100 | — | 100 | 100 |
| | | EPOCROS *2 | 5 | 5 | — | 5 | 5 |
| | | Water dispersion carbon *3 | 10 | 10 | — | 10 | 10 |
| | | AZ Coat 5800MT *13 | 4 | 4 | — | 4 | — |
| | | SN Defoamer 777 *6 | 1 | 1 | — | 1 | 1 |
| | | SN Wet 970 *7 | 1 | 1 | — | 1 | 1 |
| | | UH420 *8 | 1.6% | 1.6% | — | 1.6% | 1.6% |
| | | Resin component *9 | — | — | 100 | — | — |
| | | Excel Hardener HX *10 | — | — | 12 | — | — |
| | | AEROSIL R812S *11 | — | — | — | — | — |
| | | Methylcyclohexane *12 | — | — | 100 | — | — |
| Film thickness | | Film thickness of elastic layer (mm) | 0.075 | 0.086 | 0.061 | 0.075 | 0.078 |
| | | Film thickness of surface layer (mm) | 0.123 | 0.141 | 0.121 | 0.083 | 0.085 |
| | | Total film thickness before left to stand (mm) | 0.198 | 0.227 | 0.182 | 0.158 | 0.163 |
| | | Film thickness after left to stand under high temperature and high humidity (mm) | 0.203 | 0.238 | 0.188 | 0.167 | 0.187 |
| | | Ratio of film thickness | 1.025 | 1.048 | 1.033 | 1.057 | 1.147 |
| | Existence of dripping | | None | None | None | Exist | Exist |

*1: Water emulsion of acrylonitrile-acrylic acid alkyl ester-methacrylic acid-methacrylic acid glycidyl copolymer (manufactured by KOATSU GAS KOGYO CO., LTD., crosslinking temperature 130° C.)
*2: Emulsion of oxazoline group containing styrene-acrylic copolymer (manufactured by NIPPON SHOKUBAI CO., LTD.)
*3: Water dispersible carbon (manufactured by MIKUNI COLOR LTD.)
*4: Hydrophilic silica (manufactured by Tokuyama Corporation)
*5: Sodium salt cross-linkage in the acrylic acid polymerization (manufactured by Sumitomo Seika Chemicals Company Limited)
*6: Defoamer (manufactured by SAN NOPCO LIMITED)
*7: Wetting agent (manufactured by SAN NOPCO LIMITED)
*8: Thickener (manufactured by ADEKA CORPORATION) ("%" in the Table means "% by mass")
*9: Acryl urethane resins (manufactured by Asia Industry Co., Ltd.)
*10: Hexane diisocyanate trimer (manufactured by Asia Industry Co., Ltd.)
*11: Silica silylate (manufactured by Nippon Aerosil Co., Ltd.)
*12: Methyl cyclohexane (manufactured by KANTO CHEMICAL CO., INC.)
*13: Ammonium zirconium carbonate (manufactured by SAN NOPCO LIMITED)

In the conductive roller of Examples 1 to 3, dripping during the manufacture thereof is restrained. In addition, a conductive roller does not stick to a photoconductor or the like even under high temperature and high humidity and the surface layer was not peeled off. On the other hand, in Comparative Examples 1 and 2, dipping during the manufacture thereof cannot be sufficiently restrained. The film the elastic layer is formed by using a coating for elastic layers containing a liquid absorbing agent, and the surface layer is formed by using a coating for surface layers, wherein both of the coating for elastic layers and the coating for surface layers contain a water-based coating which is an emulsion or dispersion, and the water-based coating used in the elastic layer is a water-based acrylic resin having acrylonitrile and n-butyl acrylate as essential components and optionally having other monomers, and the monomer ratio of n-butyl acrylate and acrylonitrile is in a range of 1 to 25:99 to 75 based on molar ratio.

2. The conductive roller according to claim 1, which has two or more layers of the elastic layers, each of the elastic layers being formed by using a coating for elastic layers containing a liquid absorbing agent.

3. The conductive roller according to claim 2, wherein the water-based coating is a water-based acrylic resin.

4. The conductive roller according to claim 1, wherein the liquid absorbing agent is hydrophilic silica or water absorbing polymer.

5. The conductive roller according to claim 1, wherein the coating for surface layers contains a waterproofing agent.

6. The conductive roller according to claim 1, wherein the water-based coating is a water-based acrylic resin.

7. The conductive roller according to claim 1, wherein the water-based acrylic resin contains a group having an active hydrogen, and the ratio of a monomer containing such an active hydrogen is in a range of 3 to 6% of the total amount of monomers.

8. A manufacturing method of a conductive roller comprising:
   an elastic layer formation step (A) in which a coating for elastic layers containing a liquid absorbing agent is applied on the outer periphery of a shaft by a dipping method and dried to form an elastic layer; and
   a surface layer formation step (B) in which, after the elastic layer formation step (A), a coating for surface layers is applied on the formed elastic layer by a dipping method and dried to form a surface layer,
   wherein, as the coating for elastic layers and the coating for surface layers, ones containing a water-based coating are used, and the water-based coating is an emulsion or dispersion, and
   the water-based coating used in the elastic layer is a water-based acrylic resin having acrylonitrile and n-butyl acrylate as essential components and optionally having other monomers, and the monomer ratio of n-butyl acrylate and acrylonitrile is in a range of 1 to 25:99 to 75 based on molar ratio.

9. The manufacturing method of a conductive roller according to claim 8, wherein the elastic layer formation step (A) is repeated.

10. The manufacturing method of a conductive roller according to claim 8, wherein, as the liquid absorbing agent, hydrophilic silica or water absorbing polymer is used.

11. The manufacturing method of a conductive roller according to claim 8, wherein a waterproofing agent is contained in the coating for surface layers.

12. The manufacturing method of a conductive roller according to claim 8, wherein the water-based acrylic resin contains a group having an active hydrogen, and the ratio of a monomer containing such an active hydrogen is in a range of 3 to 6% of the total amount of monomers.

13. A conductive roller comprising a shaft, at least one elastic layer formed on the outer periphery of the shaft and a surface layer formed on the outer peripheral surface of the elastic layer, wherein
   the elastic layer is formed by using a coating for elastic layers containing a liquid absorbing agent, and the surface layer is formed by using a coating for surface layers,
   wherein both of the coating for elastic layers and the coating for surface layers contain a water-based coating,
   the liquid absorbing agent is water absorbing polymer,
   the amount of the water absorbing polymer is 0.1 to 3.0 parts by mass with respect to 100 parts by mass of the water-based coating contained in the coating of the elastic layer, and
   the water-based coating used in the elastic layer is a water-based acrylic resin having acrylonitrile and n-butyl acrylate as essential components and optionally having other monomers, and the monomer ratio of n-butyl acrylate and acrylonitrile is in a range of 1 to 25:99 to 75 based on molar ratio.

14. The conductive roller according to claim 13, wherein the water-based coating is emulsion or dispersion.

15. The conductive roller according to claim 13, wherein the water-based acrylic resin contains a group having an active hydrogen, and the ratio of a monomer containing such an active hydrogen is in a range of 3 to 6% of the total amount of monomers.

\* \* \* \* \*